US012688115B2

(12) United States Patent
Greer et al.

(10) Patent No.: US 12,688,115 B2
(45) Date of Patent: Jul. 21, 2026

(54) DYNAMIC FUNCTIONAL TESTING TOOL

(71) Applicant: FMR LLC, Boston, MA (US)

(72) Inventors: Bryson Greer, Smithfield, NC (US); Michael Furlong, Durham, NC (US)

(73) Assignee: FMR LLC, Boston, MA (US)

( * ) Notice: Subject to any disclaimer, the term of this patent is extended or adjusted under 35 U.S.C. 154(b) by 359 days.

(21) Appl. No.: 18/378,453

(22) Filed: Oct. 10, 2023

(65) Prior Publication Data

US 2025/0117312 A1 Apr. 10, 2025

(51) Int. Cl.
*G06F 11/3698* (2025.01)
*G06F 11/3668* (2025.01)

(52) U.S. Cl.
CPC ...... *G06F 11/3698* (2025.01); *G06F 11/3684* (2013.01)

(58) Field of Classification Search
CPC ............................................ G06F 11/36–3698
See application file for complete search history.

(56) References Cited

U.S. PATENT DOCUMENTS 10,061,687 B2 * 8/2018 Nagamalla .......... G06F 11/3692
10,509,717 B1 * 12/2019 Surana ................ G06F 11/3684

2003/0007014 A1 * 1/2003 Suppan ..................... G06F 8/38
715/853
2015/0363304 A1 * 12/2015 Nagamalla .......... G06F 11/3648
702/123
2021/0117313 A1 * 4/2021 Geary ................. G06F 11/3495
2022/0229767 A1 * 7/2022 Kurabayashi ....... G06F 11/3684

* cited by examiner

*Primary Examiner* — Todd Aguilera
(74) *Attorney, Agent, or Firm* — Cesari and McKenna, LLP

(57) ABSTRACT

A computer-implemented method is provided for producing a test for a software application that is generated based on metadata. The method includes providing to the user a library of predefined test logic for testing multiple software components. Each software component is a reusable element comprising application logic, visual styling and user interface. The method also includes guiding the user to define (i) at least one execution path that specifies an order for testing one or more pages of the software application, and (ii) test instructions for one or more components on each of the one or more pages. The method further includes retrieving, from the library, predefined test logic for the one or more components if they are present in the library based on the test instructions supplied by the user, and automatically configuring a test file incorporating the predefined test logic in an order specified by the execution path.

13 Claims, 5 Drawing Sheets

200

Guide the user to define (i) at least one execution path that specifies an order for testing one or more pages of the software application, and (ii) test instructions for one or more components on each of the one or more pages — 202

Retrieve from the library predefined test logic for the one or more components if they are present in the library based on the test instructions supplied by the user — 204

Automatically configure a test file incorporating the predefined test logic in an order specified by the at least one execution path — 206

Execute the test file to test the software application by dynamically accessing the one or pages in the at least one execution path and testing the one or more components on each page following the corresponding test logic — 208

101

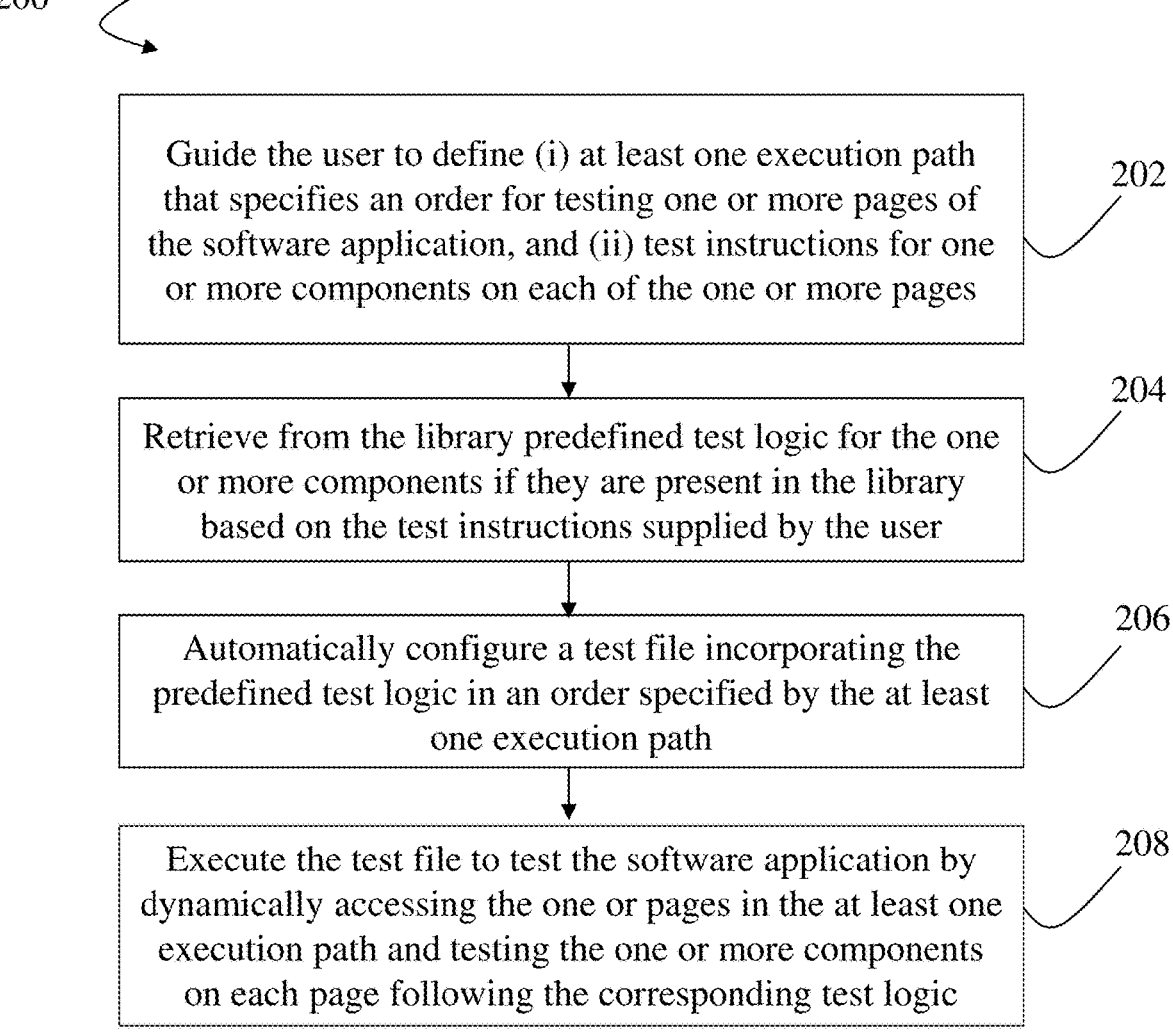

200

Guide the user to define (i) at least one execution path that specifies an order for testing one or more pages of the software application, and (ii) test instructions for one or more components on each of the one or more pages — 202

Retrieve from the library predefined test logic for the one or more components if they are present in the library based on the test instructions supplied by the user — 204

Automatically configure a test file incorporating the predefined test logic in an order specified by the at least one execution path — 206

Execute the test file to test the software application by dynamically accessing the one or pages in the at least one execution path and testing the one or more components on each page following the corresponding test logic — 208

```
{
  "flowId": "dod",
  "prepareTestAccounts": false,
  "accessibility": {
      "autoCatEnabled": true,
      "email": "yourTeamEmail@fmr.com"
  },
  "environment": "dit",
  "currentPathIndex": 0,
  "currentPageIndex": 0,
  "paths": [
   {...},
   {...}
  ],
  "pages": {
    "education": {...},
    "accountselection": {...},
    "anotherPage": {...},
    ...
  }
}
```

```
{
  "name": "happy path",
  "prgwOrFtgw": "ftgw",
  "userId": "000000097",
  "queryParams": {
      "workItem": "W327937-06JUN22"
   },
  "pages": [
    "education",
    "accountselection",
    "termsandconditions",
    "confirmation"
  ]
}
```

FIG. 4

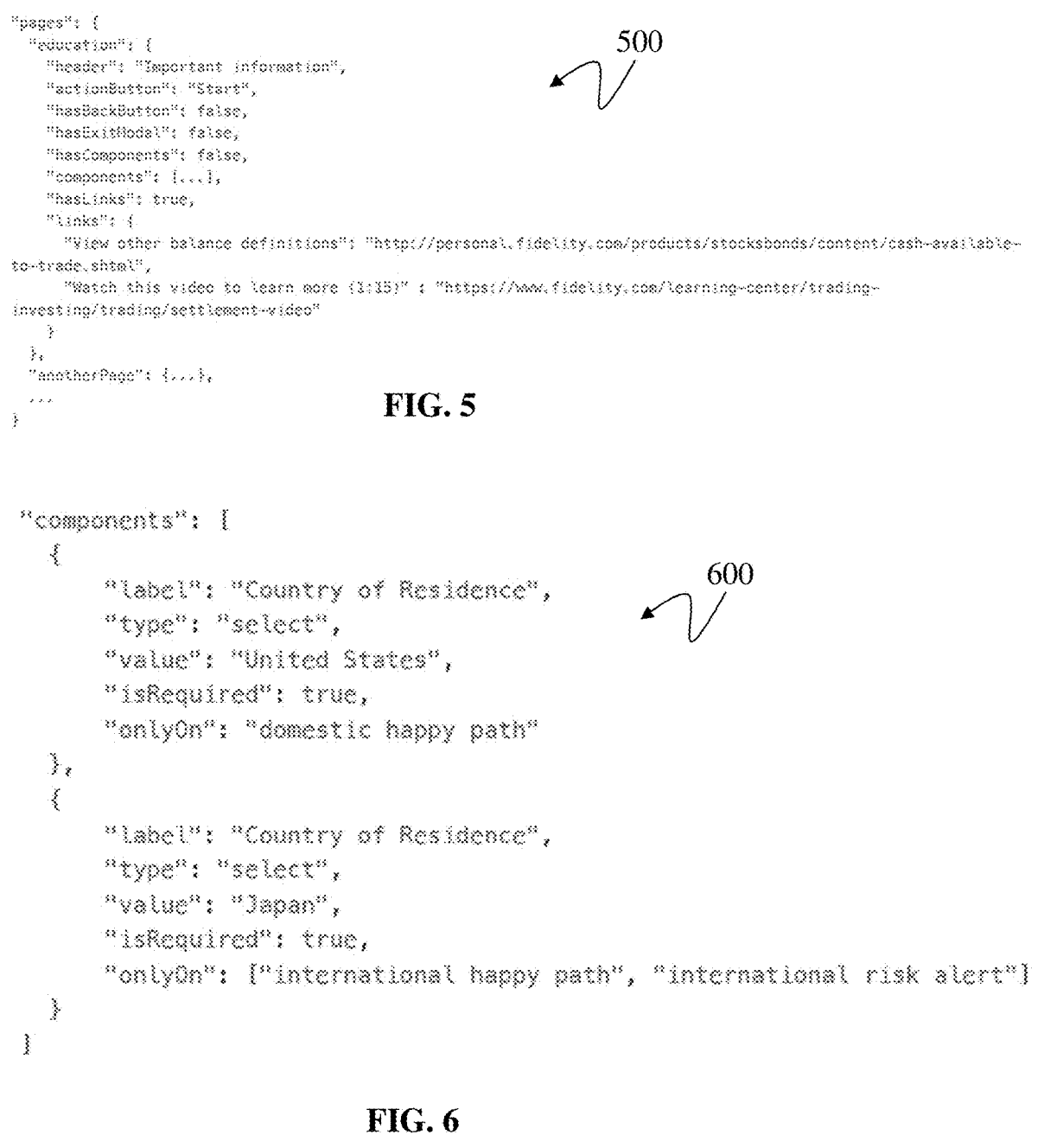

```
"pages": {
  "education": {
    "header": "Important information",
    "actionButton": "Start",
    "hasBackButton": false,
    "hasExitModal": false,
    "hasComponents": false,
    "components": [...],
    "hasLinks": true,
    "links": {
      "View other balance definitions": "http://personal.fidelity.com/products/stocksbonds/content/cash-available-
to-trade.shtml",
      "Watch this video to learn more (1:35)" : "https://www.fidelity.com/learning-center/trading-
investing/trading/settlement-video"
    }
  },
  "anotherPage": {...},
  ...
}
```

FIG. 5

```
"components": [
  {
      "label": "Country of Residence",
      "type": "select",
      "value": "United States",
      "isRequired": true,
      "onlyOn": "domestic happy path"
  },
  {
      "label": "Country of Residence",
      "type": "select",
      "value": "Japan",
      "isRequired": true,
      "onlyOn": ["international happy path", "international risk alert"]
  }
]
```

```
"components": [
  {
    "label": "Country of Residence",
    "type": "select",
    "value": "United States",
    "isRequired": true,
    "findById": "#country-of-residence-abc123"
  },
  {
    "label": "Country of Residence",
    "value": "Japan",
    "type": "select",
    "isRequired": true,
    "findById": "#country-of-residence-def456"
  }
]
```

FIG. 7

DYNAMIC FUNCTIONAL TESTING TOOL

TECHNICAL FIELD

This application generally relates to systems, methods and apparatuses, including computer program products, for producing a test for a software application.

BACKGROUND

Existing software testing tools are unable to automate a test writing process due to lack of business knowledge and software architecture knowledge. Therefore, there is a need for a software testing tool that can take advantage of existing testing architecture to facilitate automation of test writing processes.

SUMMARY OF THE INVENTION

The present invention provides a modular and user configurable approach for creating a functional test for a software application. In one exemplary implementation, a developer can create a metadata configuration file that provides testing instructions for his/her software application. More specifically, the configuration file can include metadata instructions for testing functionalities associated with different execution paths through the application. Based on this metadata configuration file, the present invention can dynamically access pages of the software application in accordance with the execution paths and test functionalities on each page.

In one aspect, the present invention features a computer-implemented method for producing a test for a software application that is generated based on metadata. The method includes providing to a user, by a computing device, a library of predefined test logic for testing a plurality of software components. Each software component is a reusable element comprising of application logic, visual styling and user interface. Each software component is configured to operate on user input. The method also includes guiding, by the computing device, the user to define (i) at least one execution path that specifies an order for testing one or more pages of the software application, and (ii) test instructions for one or more components on each of the one or more pages. The method also additionally includes retrieving from the library, by the computing device, predefined test logic for the one or more components if they are present in the library based on the test instructions supplied by the user. The predefined test logic comprises predefined steps of simulating user interaction with a component. The method further includes automatically configuring, by the computing device, a test file incorporating the predefined test logic in an order specified by the at least one execution path, and executing, by the computing device, the test file to test the software application by dynamically accessing the one or pages in the at least one execution path and testing the one or more components on each page following the corresponding test logic.

In another aspect, the present invention features a computer-implemented system for producing a test for a software application that is generated based on metadata. The computer-implemented system comprises a computing device having a memory for storing instructions. The instructions, when executed, configure the computer-implemented system to provide a library of predefined test logic for testing a plurality of software components. Each software component is a reusable element comprising of application logic, visual styling and user interface. Each software component is configured to operate on user input. The computer-implemented system also provides a configuration module configured to allow the user to define (i) at least one execution path that specifies an order for testing one or more pages of the software application, and (ii) test instructions for one or more components on each of the one or more pages. The configuration module is adapted to retrieve from the library predefined test logic that comprises predefined steps simulating user interaction with the one or more components. The configuration module is further configured to automatically generate a test file incorporating the test logic in an order specified by the at least one execution path. The computer-implemented system further provides an execution module configured to execute the test file to test the software application by dynamically accessing the one or pages in the at least one execution path and testing the one or more components on each page following the corresponding test logic.

Any of the above aspects can include one or more of the following features. In some embodiments, if predefined test logic of the one or more components on a page is not found in the library, the user specified instructions for testing the one or more components and the user-specified test instructions is stored in the library for future testing of the one or more components. In some embodiments, the test file is configured by combining the user-specified test instructions for the undefined components with the test logic retrieved from the library for the defined components.

In some embodiments, retrieving from the library predefined test logic comprises guiding, by the computer device, the user to select from the library the predefined test logic for testing at least one user interaction with respect to the one or more components. In some embodiments, the at least one user interaction comprises clicking a button or opening or closing a modal.

In some embodiments, the test file is a JavaScript Object Notation (JSON) file. In some embodiments, the component comprises a checkbox, a textbox or a menu. In some embodiments, the test file is executable on a plurality of computing platforms including ANDROID®, iPhone Operating System (IOS®) and web.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 shows an exemplary computer-implemented process for producing a test for a software application using the testing system of FIG. 1, according to some embodiments of the present invention.

FIG. 3 shows an exemplary object file defining metadata for testing a software application, according to some embodiments of the present invention.

FIG. 4 shows an exemplary path definition object for the object file of FIG. 3, according to some embodiments of the present invention.

FIG. 5 shows an exemplary page definition object for the object file of FIG. 3, according to some embodiments of the present invention.

FIG. 6 shows an exemplary components object for the page definition object file of FIG. 5, according to some embodiments of the present invention.

FIG. 7 shows another exemplary components object for the page definition object file of FIG. 5, according to some embodiments of the present invention.

DETAILED DESCRIPTION

Figure 1:
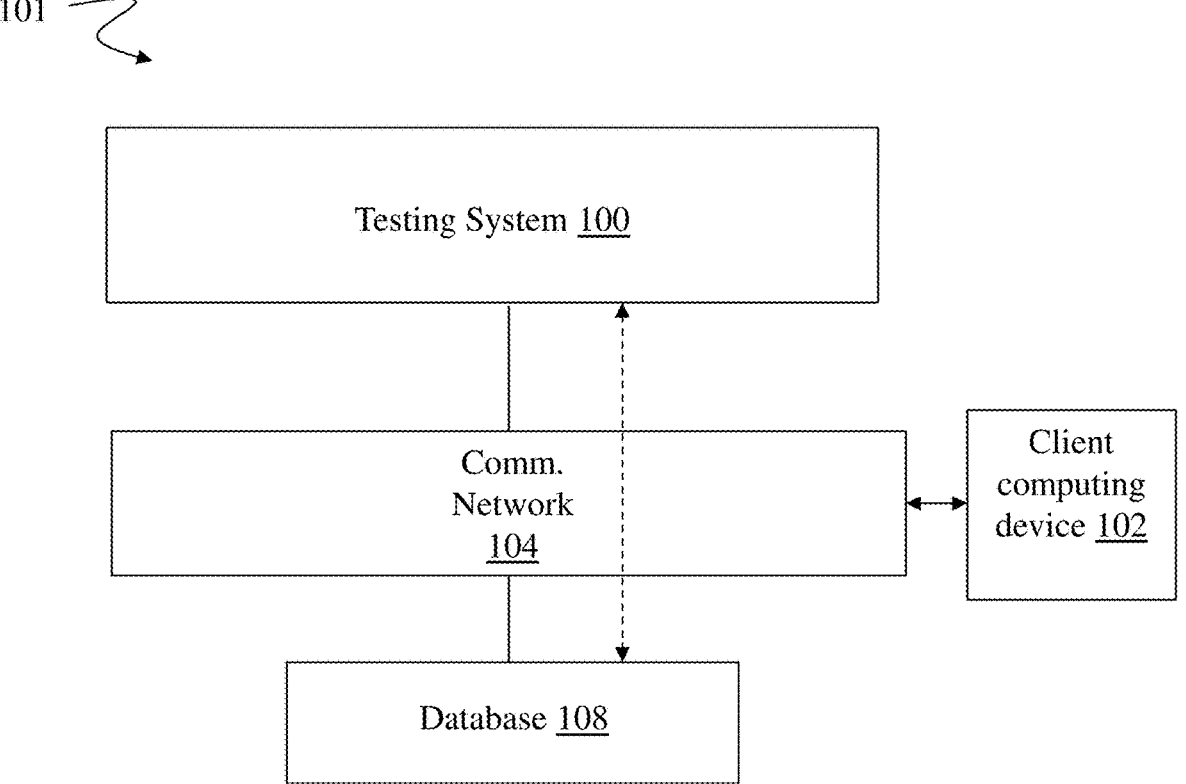
FIG. 1 shows an exemplary computing environment for configuring and executing a test for a software application, according to some embodiments of the present invention.

FIG. 1 shows an exemplary computing environment for configuring and executing a test for a software application, according to some embodiments of the present invention. As shown, the computing environment 101 generally includes at least one client computing devices 102, a communication network 104, a testing system 100 and at least one database 108.

The client computing device 102 can connect to the communication network 104 to communicate with the testing system 100 to provide inputs and receive outputs for configuring a test for a software application as described herein. Exemplary computing devices 102 include, but are not limited to, telephones, desktop computers, laptop computers, tablets, mobile devices, smartphones, and internet appliances. It should be appreciated that other types of computing devices capable of connecting to the components of the computing environment can be used without departing from the scope of invention.

The communication network 104 enables components of the computing environment 101 to communicate with each other. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the computing environment 101 to communicate with each other.

The testing system 100 is a combination of hardware, including one or more processors and one or more physical memory modules and specialized software engines that execute on the processor of the testing system 100, to receive data from other components of the computing environment 101, transmit data to other components of the computing environment 101, and perform functions as described herein. In some embodiments, the components of the testing system 100 are specialized sets of computer software instructions programmed onto a dedicated processor in the testing system 100 and can include specifically-designated memory locations and/or registers for executing the specialized computer software instructions.

The database 108 is a computing device (or in some embodiments, a set of computing devices) that is coupled to and in communication with the testing system 100 and is configured to provide and store various types of data received and/or created for the purpose of generating functional tests for various software applications. In some embodiments, all or a portion of database 108 is integrated with the testing system 100 or located on a separate computing device or devices. For example, the database 108 can comprise one or more databases, such as MySQL™ available from Oracle Corp. of Redwood City, California.

FIG. 2 shows an exemplary computer-implemented process 200 for producing a test for a software application using the testing system 100 of FIG. 1, according to some embodiments of the present invention. At step 202, the testing system 100 receives, via a client computing device 102, a set of instructions for testing a software application. In some embodiments, the testing system 100 presents a graphical user interface (GUI) configured to guide the user to define the instructions for testing a software application. The instructions can include (i) at least one execution path that specifies an order for testing one or more pages of the software application, and (ii) metadata for testing one or more components on each of the one or more pages. In the context of the present invention, a component is defined as a reusable function for testing an element of a software application by, for example, simulating human interactions with the element. The component is reusable in that the same element can be repeated in other pages of the software application or in different applications. Each component can include application logic, visual styling and user interface. Each component is configured to operate on user input in relation to one or more elements (e.g., checkboxes, text elements, toggles, dropdown menus, etc.) by simulating user interactions with these elements.

In some embodiments, the test metadata provided by the user is in a JavaScript Object Notation (JSON) file. FIG. 3 shows an exemplary JSON file 300 defining metadata for testing a software application, according to some embodiments of the present invention. This test file 300 can be provided by the user as an input file to the testing system 100. As shown in the exemplary file 300, the "flowId" key field specifies the application ("flow") being tested. The "prepareTestAccounts" key field specifies a Boolean value that determines whether test accounts need to be unenrolled to execute properly. The "accessibility" key field specifies an email account for receiving accessibility reports. The "environment" key field specifies a string value that describes the test environment. The "currentPathIndex" key field specifies an integer value for tracking paths tested during test execution. The "currentPageIndex" specifies an integer value for tracking pages of the software application tested during test execution. The "path" key field specifies the different paths through the software application for testing purposes, which will be described below in detail with reference to FIG. 4. The "pages" key field is an object that holds metadata about each page of the software application to be tested, which will be described below in detail with reference to FIG. 5. In general, these pages can be represented as key-value pairs under the "pages" attribute of the metadata object file 300.

FIG. 4 shows an exemplary path definition object 400 for the object file 300 of FIG. 3, according to some embodiments of the present invention. As shown, the "name" key field defines the name of the test execution path, which can be descriptive of the scenario being tested. The "prgwOrFtgw" key field specifies if the URL of the software application includes prgw (pre-login) or ftgw (post-login), where prgw may require bypass login. The "UserId" key field specifies the test account used for login purposes. This field may not be required for prgw transactions. The "queryParams" key field specifies query parameters required to visit the software application's first page, including one or more key-value pairs mapped to the parameters. The "pages" key field specifies an array of page names associated with the software application, where the page names are listed in a desired order of testing. Thus, the array constitutes an execution path for testing the software application.

FIG. 5 shows an exemplary page definition object 500 for the object file 300 of FIG. 3, according to some embodiments of the present invention. As shown, the page definition object 500 defines testing metadata for a specific page of the software application to be tested. The metadata can be represented as key-value pairs. In some embodiments, most of the values are Boolean, representing whether interaction with a software element on that page should be tested. For each page, the key is the xflow page name and the value is the page. As shown, the "header" key specifies a string representing the value of the xflow page's header. The "actionButton" key specifies a string representing the text on the action Button (e.g., "continue," "next" or "submit.") The "hasBackButton" key specifies a Boolean value describing the presence of xflow "back" button. The "hasExitModal" key specifies a Boolean value describing the presence of xflow Exit Modal. The "hasComponents" key specifies a Boolean value describing the presence of components that require user input. The "components" key specifies an array comprising the components necessary to fill in, as will be described in detail below with reference to FIG. 6. The "hasLinks" key specifies a Boolean value describing the presence of links to be tested. The "links" key specifies an object containing key value pairs representing links. For each link, the key is the text and the value is the href.

FIG. 6 shows an exemplary components object 600 for the page definition object 500 of FIG. 5, according to some embodiments of the present invention. As described above, a component is a reusable function for testing an element of a software application by, for example, simulating human interactions with the element. A component is reusable in that the same element can be repeated in other pages of the software application or in different applications. Each component can include application logic, visual styling and user interface. Each component is configured to operate on user input in relation to one or more elements by simulating user interactions with these elements. Exemplary elements can include checkboxes, text components, toggles, dropdown menus, etc. Exemplary user inputs can include addresses, company names, emails, occupations, etc. These components can be iterated throughout a page to test error handling and/or form submission. As shown, for each component definition, the "type" key specifies the type of component being tested. The "label" key specifies the visual label of the component. If a component had no label, the value is merely an empty string. The "value" key specifies the value to enter into the component for the purpose of testing. For example, the "any" value means usage of a default value and a "none" value mean the value will be left blank. The "isRequired" key specifies a Boolean value describing whether the component is required for form submission. In some embodiments, the components object 600 includes an "onlyOn" key specifying a string or an array of strings providing the paths the component is used on. If this key value is left blank, it means that the component is used in all test paths. In some embodiments, the component object 600 includes a "find-ById" key specifying a string that represent the custom DOM identification assigned to the corresponding element, which is useful in situations where a label is repeated on the same page.

As shown in the exemplary components object 600 of FIG. 6, if a component needs to be filled out differently depending on which test path is being tested, each component's "onlyOn" key can be assigned the string names of the respective paths. More specifically, for the example of FIG. 6, a page can have multiple components with the same label (e.g., "country of Residence"), but are supplied with different test values (e.g., "United States" and "Japan") for different test paths as specified by the "onlyOn" key field. In yet another example of a components object 700 as shown in FIG. 7, a page can have multiple components with the same label (e.g., "country of Residence"), but are supplied with different test values (e.g., "United States" and "Japan") and are differentiated using the "findById" key attribute.

Referring back to FIG. 2, after receiving the necessary instructions for testing a software application, the testing system 100 at step 204 is configured to retrieve, from a library of predefined test logic for testing various components, the test logic specific to the components defined by the user (from step 202). In some embodiments, the library of predefined test logic is stored in database 108 and correlated to respective ones of the components. In some embodiments, a user can browse through the library to select components that include predefined test logic for testing user interactions with certain elements, such as testing clicking a button or opening/closing a modal on a page. Thus, the testing system 100 provides a low-code, modular and user-configurable approach for creating a functional test for a software application. In some embodiments, if a desired component for testing an element is not found in the library, the user can provide to the testing system 100 instructions for testing the element and the testing system 100 can store the user-specified test instructions as a modular component in the library for future testing of that component in relation to the same or different software applications.

At step 206, testing system 100 automatically configures the test file by incorporating the predefined test logic of the components in an order specified by the one or more execution paths in the test metadata file, such as file 300 of FIG. 3. In the case where a component is not found/defined in the library, the testing system 100 can automatically configure the test file by combining any test logic supplied by the user with the test logic retrieved from the library for the defined components.

At step 208, testing system 100 executes the test file to test the software application by dynamically accessing the pages in the execution path and testing the components on each page following the configured test logic. Execution of the test file can simulate one or more actions the user would like to take on a page, such as clicking on a button or opening and closing a modal. Components, which are the test logic behind these actions for testing various functionalities on the page, can be reusable across different pages and/or different software applications, as described above. In some embodiments, the test file is executable on multiple computing platforms including ANDROID®, iPhone Operating System (IOS®) and web.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

The invention claimed is:

1. A computer-implemented method for producing a test for a software application that is generated based on metadata, the method comprising:

providing to a user, by a computing device comprising a microprocessor, a library of predefined test logic for testing a plurality of software components, wherein each software component is a reusable element comprising of application logic, visual styling and user interface, and wherein each software component is configured to operate on user input;

guiding, by the computing device, the user to define (i) at least one execution path that specifies an order for testing one or more pages of the software application, and (ii) test instructions for one or more components on each of the one or more pages;

retrieving from the library, by the computing device, predefined test logic for the one or more components based on the test instructions supplied by the user, the predefined test logic for each of the one or more components comprising a components object with predefined steps of simulating user interaction with the component, wherein the components object specifies a value key defining at least one value to enter into the component for testing the component and a key specifying all test execution paths the component is used on;

automatically configuring, by the computing device, a test file incorporating the predefined test logic in an order specified by the at least one execution path; and executing, by the computing device, the test file to test the software application by dynamically accessing the one or pages in the at least one execution path and testing the one or more components on each page following the test logic.

2. The method of claim 1, wherein in response to predefined test logic of one or more other components on a page not being found in the library:

receiving user-specified instructions for testing the one or more other components, and storing the user-specified test instructions in the library for future testing of the one or more other components.

3. The method of claim 2, further comprising configuring the test file by combining the user-specified test instructions for the one or more other components with the test logic retrieved from the library for the one or more components.

4. The method of claim 1, wherein retrieving from the library predefined test logic comprises guiding, by the computer device, the user to select from the library the predefined test logic for testing at least one user interaction with respect to the one or more components.

5. The method of claim 4, wherein the at least one user interaction comprises clicking a button or opening or closing a modal.

6. The method of claim 1, wherein the test file is a JavaScript Object Notation (JSON) file.

7. The method of claim 1, wherein the component comprises a checkbox, a textbox or a menu.

8. A computer-implemented system for producing a test for a software application that is generated based on metadata, the computer-implemented system comprising a computing device having a memory for storing instructions, wherein the instructions, when executed, configure the computer-implemented system to provide:

a library of predefined test logic for testing a plurality of software components, wherein each software component is a reusable element comprising of application logic, visual styling and user interface, and wherein each software component is configured to operate on user input;

a configuration module configured to allow the user to define (i) at least one execution path that specifies an order for testing one or more pages of the software application, and (ii) test instructions for one or more components on each of the one or more pages, the configuration module adapted to retrieve from the library predefined test logic for each of the one or more components that comprises a components object with predefined steps simulating user interaction with the component, wherein the components object specifies a value key defining at least one value to enter into the component for testing the component and a key specifying all test execution paths the component is used on, wherein the configuration module is further configured to automatically generate a test file incorporating the test logic in an order specified by the at least one execution path; and an execution module configured to execute the test file to test the software application by dynamically accessing the one or pages in the at least one execution path and testing the one or more components on each page following the test logic.

9. The computer-implemented system of claim 8, wherein if testing of the one or more components on a page is not defined in the library, the configuration module is configured to receive user-specified instructions for testing the one or more components, and the library is configured to store the user-specified test instructions for future testing of the one or more components.

10. The computer-implemented system of claim 8, wherein the configuration module is further configured to guide the user to select from the library the predefined test logic for testing at least one user interaction with respect to the one or more components.

11. The computer-implemented system of claim 10, wherein the at least one user interaction comprises clicking a button or opening or closing a modal.

12. The computer-implemented system of claim 8, wherein the test file is a JavaScript Object Notation (JSON) file.

13. The computer-implemented system of claim 8, wherein the component comprises a checkbox, a textbox or a menu.

* * * * *